United States Patent [19]

Thomke et al.

[11] Patent Number: 4,817,138

[45] Date of Patent: Mar. 28, 1989

[54] TELEPHONE HAVING A HANDSET AND A RASE EACH HAVING A RECEIVER AND MICROPHONE

[75] Inventors: Ernst Thomke, Granges; Markus Kappeler, Soleure, both of Switzerland

[73] Assignee: ETA SA Fabriques d'Ebauches, Grenchen, Switzerland

[21] Appl. No.: 181,278

[22] Filed: Apr. 13, 1988

[30] Foreign Application Priority Data

Apr. 14, 1987 [CH] Switzerland .................. 01456/87
Apr. 23, 1987 [FR] France .................. 87 05795

[51] Int. Cl.⁴ .................. H04M 1/03; H04M 1/02
[52] U.S. Cl. .................. 379/433; 379/376; 379/419; 379/423; 379/428; 379/434; 379/440
[58] Field of Search .................. 379/433, 419, 422, 423, 379/424, 428, 434, 440, 441, 396, 376; D14/63, 64

[56] References Cited

U.S. PATENT DOCUMENTS

| | | | |
|---|---|---|---|
| 2,589,180 | 3/1952 | Wood et al. | 379/423 |
| 2,780,677 | 2/1957 | Schuafuss | 379/423 |
| 2,870,256 | 1/1959 | Peterson | 379/423 |
| 3,022,387 | 2/1962 | Bair | D14/63 |
| 3,792,205 | 2/1974 | O'Dea | 379/419 |
| 4,107,477 | 8/1978 | Morrison | 379/424 |
| 4,178,488 | 12/1979 | Nishihata | 379/424 |
| 4,536,621 | 8/1985 | Bergen et al. | 379/423 |
| 4,636,585 | 1/1987 | Brandstätter | 379/422 |

FOREIGN PATENT DOCUMENTS

| | | | |
|---|---|---|---|
| 1276433 | 10/1961 | France . | |
| 373607 | 11/1939 | Italy | 379/428 |
| 2087686 | 5/1982 | United Kingdom . | |

Primary Examiner—Jin F. Ng
Assistant Examiner—Danita R. Byrd
Attorney, Agent, or Firm—Griffin, Branigan & Butler

[57] ABSTRACT

The telephone comprises a handset (8) having a receiver and a microphone, and a base (2) on which the handset may be placed. According to the invention, the casing (28) of the base is fitted with another receiver and another microphone and has a shape such that the base may be used as a second handset, thereby enabling two people to converse at the same time with one outside person if the phone is connected to one line or with different outside people if the phone is connected to two lines.

10 Claims, 5 Drawing Sheets

TELEPHONE HAVING A HANDSET AND A BASE EACH HAVING A RECEIVER AND MICROPHONE

INTRODUCTION

This invention relates to telephones.

It is known for telephones to have a base provided with a push-button keyboard or a disc for making telephone calls and two handsets that can be placed on the base.

These telephones, which enable two people to converse at the same time with one outside user on one line or with different outside users on two separate lines or both, are bulky.

SUMMARY OF THE INVENTION

An object of the invention is to provide a telephone able to do the same but that does not suffer from this drawback.

According to one aspect, the invention provides a telephone for connection to one end of a telephone line, which comprises a handset having a casing housing, a first receiver and a first microphone, and a base, able to support the handset, having a casing, ringing means, selector means for dialling telephone numbers, a speech circuit connected to the first receiver and to the first microphone to transmit conversation signals arriving on the line to the first receiver and those produced by the first microphone to the line, first control means actuatable by the handset and switching means that can be acted upon by the control means to connect the selector means and the speech circuit to the line when the handset is taken off, said base further having a second receiver, a second microphone and second control means also able to act on the switching means to enable the second receiver and the second microphone to be connected to the line when the handset is taken off, the base casing having a shape and the second receiver and the second microphone having an arrangement within the base casing, such that the base may be used as a second handset.

According to another aspect, the invention further provides a telephone for connection to one end of a pair of telephone lines, which comprises a handset having a casing housing a first receiver and a first microphone, and a base, able to support the handset, having a casing, ringing means, selector means for dialling telephone numbers, a first speech circuit connected to the first receiver and to the first microphone to transmit conversation signals arriving on one line to the first receiver and those produced by the first microphone to said one line, first control means actuatable by the handset, second control means actuatable manually to select one or other of the lines and switching means that can be acted upon by the first and second control means to connect the selector means and the first speech circuit to the selected line when the handset is taken off, said base further having a second receiver, a second microphone, a second speech circuit connected to the second receiver and to the second microphone, and third control means also able, upon being actuated, to act on the switching means to enable the second speech circuit to be connected to the unselected line, the base casing having a shape and the second receiver and the second microphone having an arrangement within the base casing, such that the base may be used as a second handset.

BRIEF DESCRIPTION OF THE DRAWINGS

In the accompanying drawings, given by way of example.

DETAILED DESCRIPTION OF THE INVENTION

Figure 1:
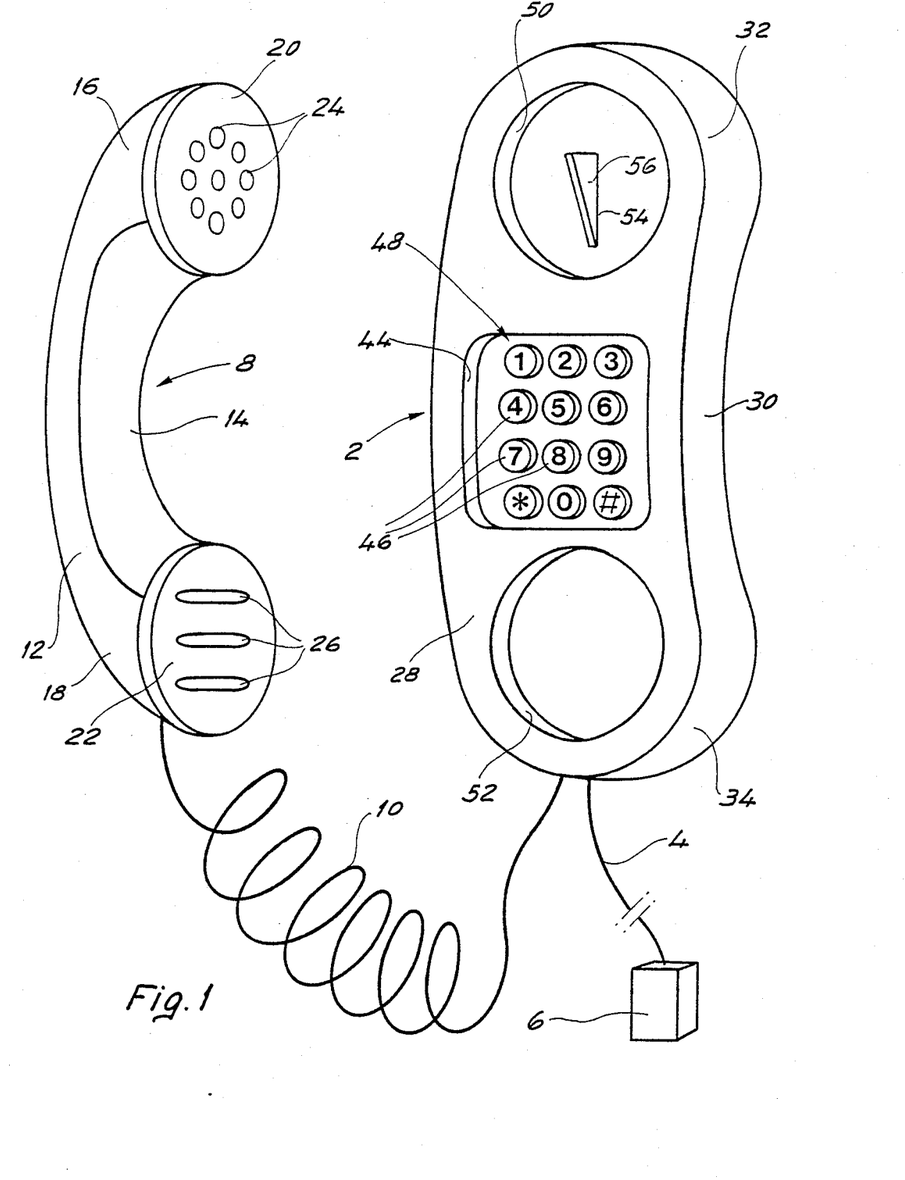
FIG. 1 is a perspective view which shows separately the base and the handset of a first form of telephone according to the invention, the base being mainly seen from above.
Figure 2:
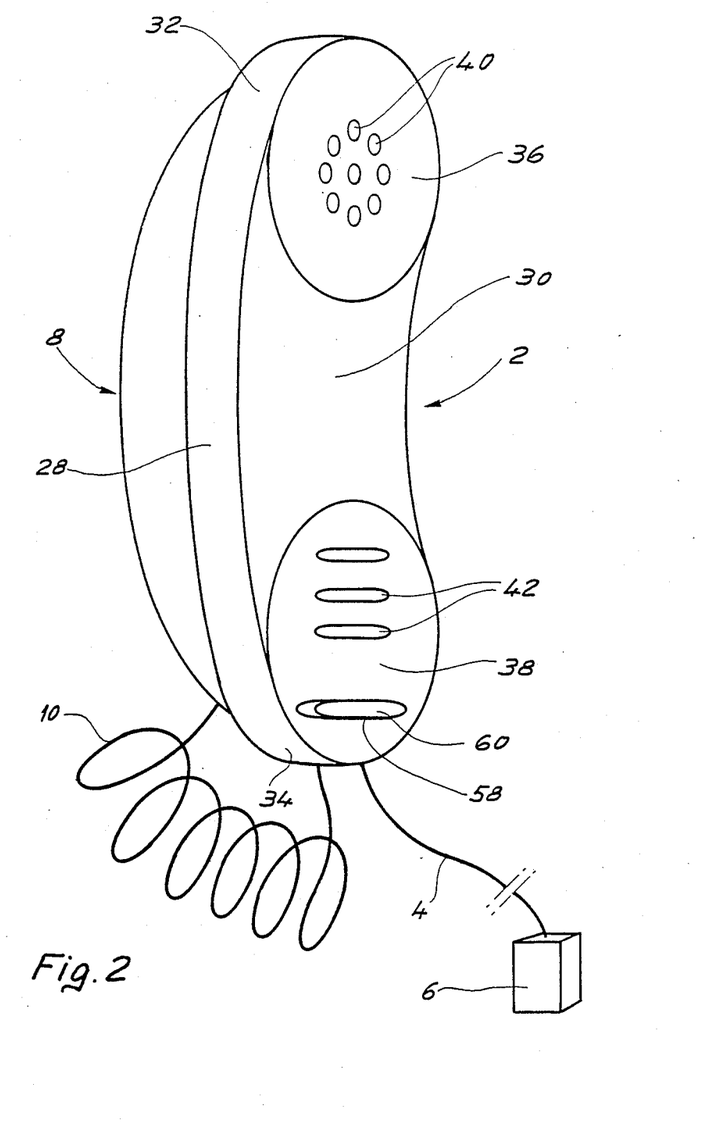
FIG. 2 is another perspective view of the same telephone showing the underside of the base with the handset positioned on the base.

The telephone shown in FIGS. 1 and 2 comprises a base 2 which may be connected to a telephone line of a network by means of a cord 4 and a plug 6, and a handset 8 which may be laid on the base and which is connected thereto by another cord, 10.

Handset 8 is conventional. It comprises an elongated and arcuate casing 12 having a middle portion 14 that can readily be hand held and two practically identical end portions 16 and 18 with substantially plane surfaces 20 and 22 that are formed with holes 24 and slots 26 respectively and behind which are fitted a receiver and a microphone not shown.

Base 2 also contains a receiver and a microphone, not shown either, and comprises a casing 28 whose general shape is similar to that of handset 8.

As will be apparent from FIGS. 1 and 2, casing 28 is also elongated and arcuate and comprises, like casing 12, a middle portion 30 intended to be hand held and two end portions 32 and 34 of more or less the same size, that are provided to the side forming the bottom of base 2 with substantially plane surfaces 36 and 38 formed with holes 40 and slots 42 (see FIG. 2) and in which are housed the receiver and microphone mentioned above.

There are of course also differences between the two.

The first difference is that the casing 28 of base 2 is a little larger than that of handset 8.

The second is that surfaces 36 and 38 of base 2 are substantially in a common plane so that base 2 should be stable when it rests on some flat support, e.g. a telephone table. This is not the case, or at least not necessary, with handset 8.

It is of course not essential for surfaces 36 and 38 to be flat to achieve such stability. For instance, the same result could be achieved with slightly hollow surfaces having their edges in a common plane, or with slightly bulging surfaces having only flat and coplanar central portions, or with a combination of these two possibilities.

A third difference between the two casings is that the top or back of the casing 28 of base 2 is formed with a recess 44 in its central portion 30 out of the bottom of which project twelve keys 46 of a conventional keyboard 48, and with two other, smaller recesses 50 and 52, in end portions 32 and 34, shaped to accommodate the end portions of handset 8 when the latter is properly put down on base 2. In the bottom of one of the two recesses, i.e. recess 50, there is a slot 54 through which may project a control button 56 having the same function as the hook in an ordinary telephone. As long as handset 8 is left on base 2, control button 56, referred to below as the main control button, remains depressed under the weight of handset 8 and the telephone is unable to operate except for its ringing means. But when handset 8 is lifted, button 56 pops up automatically and the telephone is then connected to the line at whose end it is fitted.

A fourth difference between the casing 28 of base 2 and the casing 12 of handset 8 is that the surface 38 of casing 28 is formed, besides slots 12 mentioned earlier that are provided to let voice sounds through, with another slot, 58, in which can move, with a to-and-fro action, an auxiliary button 60 of a kind similar to button 56 for cutting in or out the microphone and the receiver that are contained in base 2.

After having particularly discussed the outer appearance of the telephone, its electric circuitry will now be described with reference to FIG. 3 in which casings 12 and 28 of handset 8 and base 2 have been symbolized by rectangles drawn in broken lines.

Figure 3:
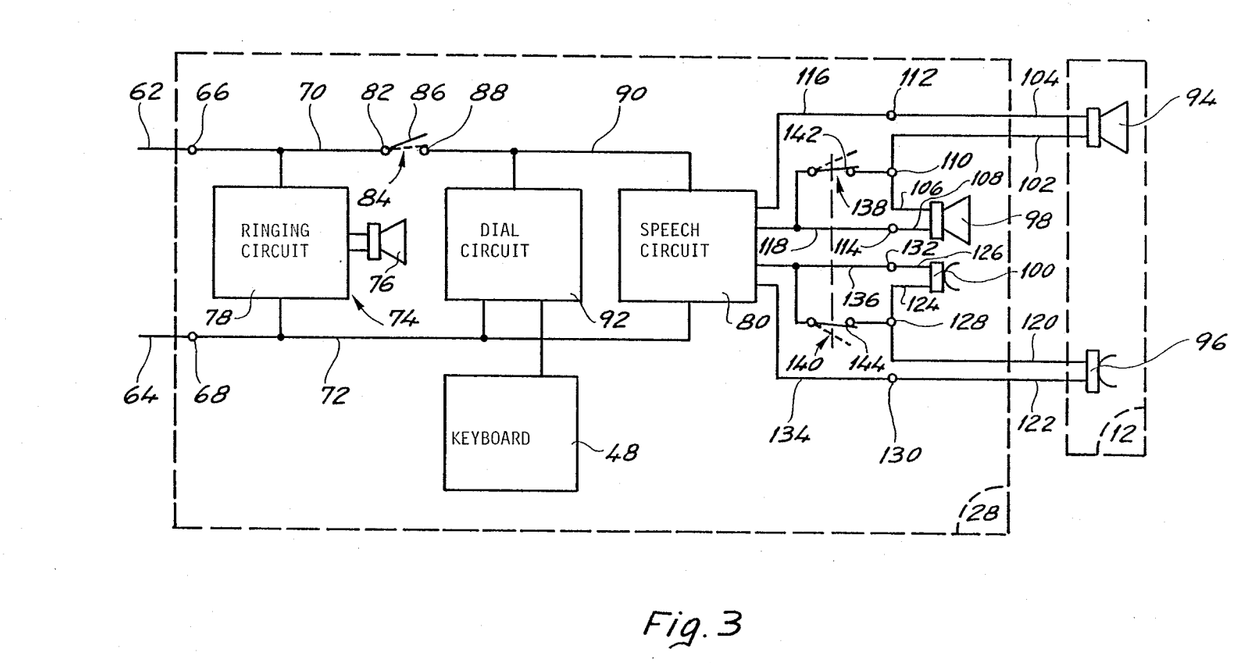
FIG. 3 is a simplified block-diagram of the electric circuitry of this first telephone.

In FIG. 3, cord 4 (FIGS. 1 and 2) is shown to have two wires 62 and 64 which extend those of the telephone line at whose end the telephone is meant to be fitted, and which respectively end at two terminals 66 and 68 of the circuitry.

From terminals 66 and 68 extend a pair of conductors 70 and 72 which, like those that will be described below, may consist of conductive strips of a printed circuit and between which are connected ringing means 74 comprised of a piezo-electric buzzer 76 and of its control circuit 78.

As can be seen, conductor 72 leads directly to circuit 80 which is a highly conventional telephone speech circuit, and conductor 70 only connects terminal 66 to one terminal, 82, of a plain on-off switch 84 whose mobile contact 86 is actuated by main control button 56 (see FIG. 1) and whose other contact, 88, is connected by another conductor, 90, to speech circuit 80.

As is known, the speech circuit, in an ordinary telephone, is that which processes and transmits conversation signals from the line to the receiver and those produced by the microphone to the line.

Further, it will also be observed that, between conductors 72 and 90, there is connected another, highly conventional, circuit 92. Circuit 92, which is connected to the selector keyboard 48, diagrammatically represented in FIG. 3 by a rectangle, is that charged with producing and transmitting along the line call signals when the number of a subscriber is being dialled on the keyboard.

From the way circuit 92 is connected, it will be apparent that the signals it produces are made up of pulses. Clearly, however, it could be replaced by a circuit connected to speech circuit 80 and adapted to produce call signals by combining in pairs signals of different acoustic frequencies or by a circuit able to produce both this kind of signals and pulses whereby the telephone may be connected to any network.

To conclude the description of the FIG. 3 circuit, reference should still be made to the connection of receiver 94 and of microphone 96 fitted in handset 12 and of receiver 98 and of microphone 100 fitted in base 28.

As shown in FIG. 3, receivers 94 and 98 are respectively connected by wires 102 and 106 to a common terminal 110 of the circuit and by wires 104 and 108, to terminals 112 and 114 and conductors 116 and 118 to speech circuit 80.

Also, microphones 96 and 100 are respectively connected by wires 120 and 124 to a common terminal 128 and by wires 122 and 126, terminals 130 and 132 and conductors 134 and 136 to speech circuit 80.

In other words, receivers 94 and 98 are connected in series between a pair of terminals that are connected to speech circuit 80 and the same applies to microphones 96 and 100.

Further, a pair of plain on-off switches 138 and 140 are respectively connected between terminal 110 and conductor 118 and between terminal 128 and conductor 136.

The mobile contacts 142 and 144 of switches 138 and 140, that enable receiver 98 and microphone 100 to be short-circuited, are jointly actuated by auxiliary control button 60 so as both to be either in an open position or a closed position.

Of course, to be complete, reference should also be made to the various supply circuits and to the various protection circuits, as against overvoltage and polarity reversal of the input voltage from the line, that are provided in a telephone according to the invention as in all others, but such circuits are well-known and since describing them would not help to understand the invention any better, no such description will be made not only for the embodiment being discussed but also for the one that will be described further on.

From the preceding description, the operation of the telephone shown in FIGS. 1 to 3 will readily be apparent.

As long as base 2 rests on a support and handset 8 is not lifted, control buttons 56 and 60 will remain depressed in slots 54 and 58 of base casing 28 and mobile contacts 86, 142 and 144 of switches 84, 138 and 140 will be in the positions indicated in full lines in FIG. 3, i.e. switch 86 will be open, and the other two will be closed thereby short-circuiting receiver 98 and microphone 100.

Thus, as already stated, in this situation only ringing means 74 are connected to the line to signal any incoming call.

If at any time the entire telephone is lifted, e.g. to clean its support or to move it, auxiliary control button 60 pops out and switches 138 and 140 open but this has no effect as main switch 84 remains open.

To call a subscriber, handset 8 is of course first lifted, thereby causing switch 84 to close. From then on all parts of the telephone circuitry are connected to the line, except receiver 98 and microphone 100 in base 2 since they continue to be short-circuited.

The subscriber's number can then be dialled on keyboard 48, and once obtained, a conversation may be had with him or her.

If another person wishes to take part in the conversation, he or she need simply hold base 2 in the hand and use it like a handset. As soon as base 2 is lifted switches 138 and 140 open and, like receiver 94 and microphone 96 of handset 8, receiver 98 and microphone 100 of base 2 are connected to the line via speech circuit 80, conductors 72, 90 and 70, contact 86 of switch 84 and wires 62 and leads 64 of cord 4.

Of course, handset 8 and base 2 may both be used by the same person, for instance to hear better when there is a lot of noise around.

Obviously, with an incoming call everything takes place in the same way except that, in this case, no number need be dialled.

Before describing the second embodiment that has been selected by way of example, three things can usefully still be said.

The first is that switches 84, 138 and 140 could well use transistors instead of mobile contacts and that these switches, speech circuit 80, dial circuit 92 and possibly even the circuit 78 of ringing means 74 could all be included in one integrated circuit chip.

The second is that both receivers 94 and 98 and both microphones 96 and 100 could be connected in parallel rather than in series.

And the third is that one speech circuit could be provided for the receiver 94 and microphone 96 in handset 8 and another speech circuit for the receiver 98 and microphone 100 in base 2. In that case, it would suffice to provide an on-off switch on one of the two conductors that would lead to this other speech circuit, to connect the latter to the line or to disconnect it therefrom.

What largely distinguishes the telephone that will now be described from the previous one is that it is designed to be connected to one end of two separate telephone lines and not of just one.

Externally, there is very little difference between the two. Firstly, the handset remains the same. That is why it has not been shown in FIG. 4. Secondly, the base, again referenced 2 in this Figure, retains exactly the same outward appearance and comprises the same outwardly visible parts or elements 28 to 60 as in the previous embodiment.

Figure 4:
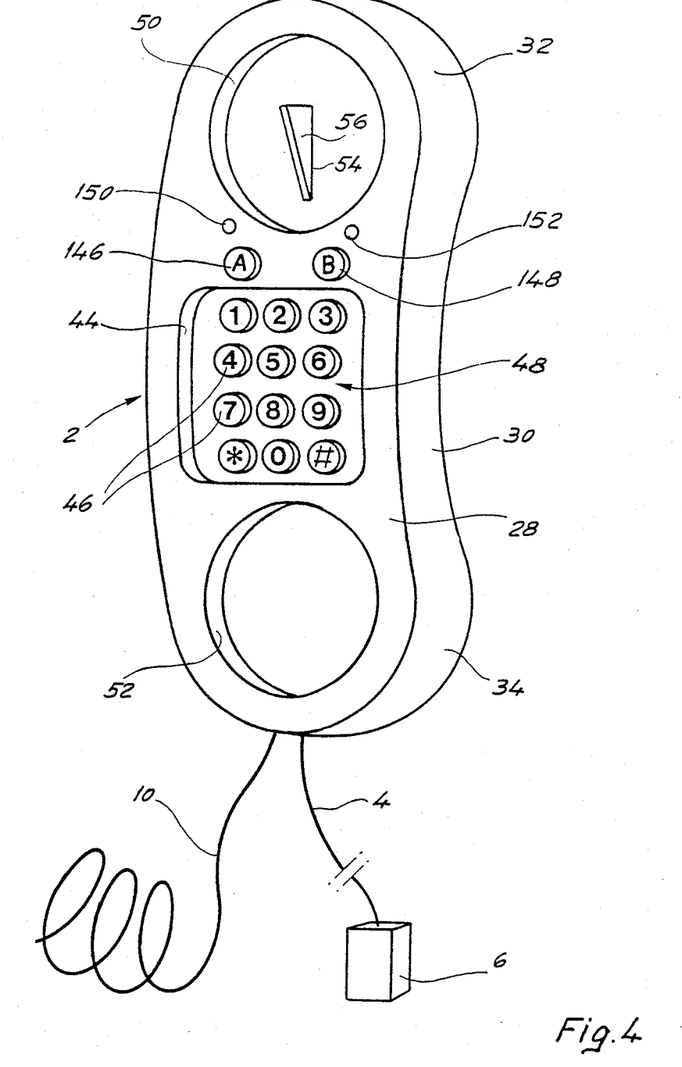
FIG. 4 is a perspective view which shows the top part of the base of a second form of telephone according to the invention.

The only novelty is the presence of two push-buttons 146 and 148 that are located above keyboard 48 and on which are marked letters A and B, and of two light emitting diodes (LED) 150 and 152 that are associated with buttons 146 and 148 and placed above them.

In this embodiment push-buttons 146 and 148, which, as will become apparent later, serve to select which line a subscriber is to be called on first or to connect the handset to the line used by an incoming call, are not independent. They are mechanically linked whereby when one of the two is pushed in, the other necessarily pops up. They thus amount to a rotary knob having two stable positions or to a sliding knob like those that are to be found in many on-off switches that enable an electric light to be switched on or off or enable household devices to be operated.

As for diodes 150 and 152, their purpose is simply to identify the line on which there is an incoming call.

In various modified constructions, use could of course also be made of push-buttons having only one stable position or push-buttons having three stables positions including a neutral one in the middle position.

Additionally, the arrangement could be made such that diodes 150 and 152 also identify the line that has been chosen for an out-going call.

Figure 5:
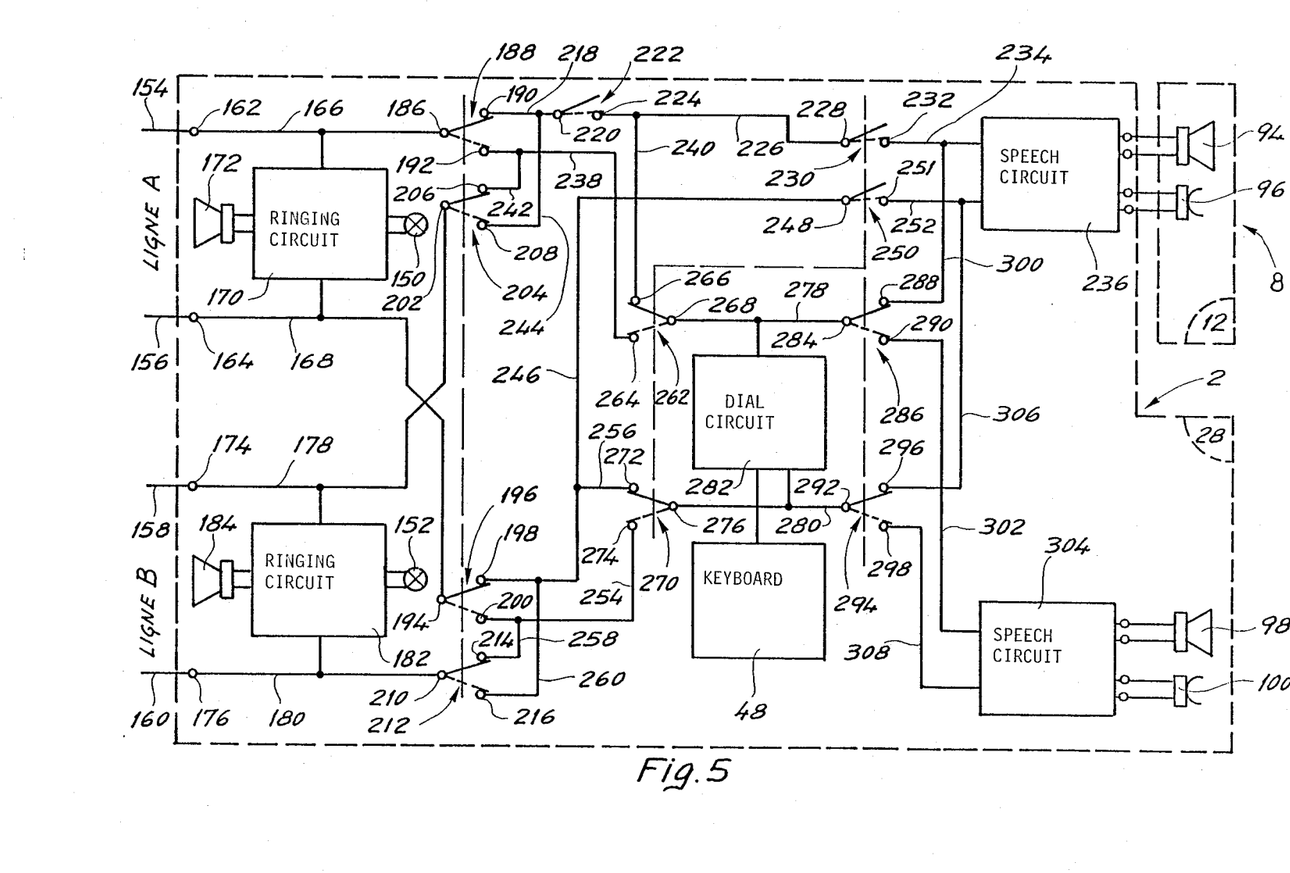
FIG. 5 is a simplified block-diagram of the electric circuitry of this second telephone.

In FIG. 5, which shows the circuitry of the second embodiment, are to be seen to the left the end portions of two wires 154 and 156 that extend those of a line A, and the end portions of two more wires, 158 and 160, that extend those of a line B, all four wires forming part of a common cord 4 (see FIG. 4) by means of which the telephone may be connected to the end of these lines.

Wires 154 and 156 are connected via circuitry terminals 162 and 164 and conductors 166 and 168 to the common terminals 186 and 194 of a pair of bistable change-over switches 188 and 196. Between conductors 166 and 168 is connected a ringing circuit 170 that controls not only a buzzer 172 but also light-emitting diode 150.

Similarly, wires 158 and 160 are connected via terminals 174 and 176 and conductors 178 and 180 to the common terminals 202 and 210 of another pair of bistable change-over switches 204 and 212. Between conductors 178 and 180 is connected a circuit 182 of second ringing means that include a second buzzer, 184, and diode 152.

Since diodes 150 and 152 already indicate which line is being used for a call it is not necessary for buzzers 172 and 184 to emit sounds of different frequencies but this is a possibility that could of course be envisaged.

As regards change-over switches 188, 196, 204 and 212, it will be apparent from the broken line that connects them in FIG. 5 that they are all controlled at the same time. But what FIG. 5 does not show is that they are controlled by push-buttons 146 and 148.

If push-buttons 146 and 148 were to have three stable positions as previously envisaged, the same would apply to the change-over switches they control and their break position would of course correspond to the intermediate and neutral position of the push-buttons.

Turning now to the top of FIG. 5, one of the non-common terminals, 190, of switch 188 is seen to be connected by a conductor 218 to one terminal of a plain on-off switch 222 which is the only one in the circuitry to be actuated by the main push-button 56 of the telephone. The other terminal, 224, of switch 222 is connected by a conductor 226 to one terminal, 228, of another plain on-off switch 230 whose mobile contact is actuated by an auxiliary control button 60 located as before underneath base 28, the other terminal, 232, of switch 230 being connected by a conductor 234 to a first speech circuit, 236, to which are connected receiver 94 and microphone 96 of handset 8 by four wires and four conductors, all unnumbered.

The other non-common terminal, 192, of switch 188 is connected by a conductor 238 to one of the non-common terminals, 264, of a fifth bistable change-over switch 262 that will be referred to again later and whose other non common terminal, 266, is connected to conductor 226 by a conductor 240.

As for non common terminals 206 and 208 of switch 204, they are simply respectively connected to conductors 218 and 238 by conductors 242 and 244.

Moreover, non common terminal 198 of switch 196 is connected by a conductor 246 to one terminal, 248, of a third on-off switch 250 whose mobile contact is also actuated by auxiliary control button 60 and whose other terminal, 251, is connected by a conductor 252 to speech circuit 236.

The other non common terminal, 200, of switch 196 is connected by a conductor 254 to one non common terminal, 274, of a sixth bistable change-over switch 270 whose other non common terminal, 272, is connected to conductor 246 by a conductor 256.

And, to conclude with switches 188, 196, 204 and 212, both non common terminals 214 and 216 of switch 212 are respectively connected to conductors 254 and 256 by conductors 258 and 260.

Reverting to switches 262 and 270, their respective common terminals 268 and 276 are connected by conductors 278 and 280 to two common terminals 284 and 292 of seventh and eighth bistable change-over switches 286 and 294. Between conductors 278 and 280 is connected a circuit 282 which is the dial circuit of the telephone and which is of course connected to keyboard 48. Dial circuit 282 is wholly conventional and may be identical to that in the previous embodiment.

Further, as suggested by the broken lines connecting them, change-over switches 262, 270, 286 and 294 are actuated by the same button as on-off switches 230 and 250 and at the same time as the latter.

There now remains to be indicated what the non common terminals of switches 286 and 294 are connected to.

As regards switch 286, one non common terminal, 288, is connected to conductor 234 by a conductor 300 and the other, 290, is connected by a conductor 302 to a second speech circuit, 304, to which are connected receiver 98 and microphone 100 housed in base 2.

As regards switch 294, one non common terminal, 296, is connected to conductor 252 by a conductor 306 and the other, 298, is connected to speech circuit 304 by a conductor 308.

The telephone just described operates as follows:

It will be assumed that button 146, associated with line 1, is pushed in. The contacts of switches 188, 196, 204 and 212 are then in the full line positions of FIG. 5 so that their common terminals 186, 194, 202 and 210 are connected to their non common terminals 190, 198, 206 and 214.

As long as base 2 remains on a support and as long as handset 8 is in place, main and auxiliary control buttons 56 and 60 are both pushed in and the mobile contacts of on-off switches 222, 230 and 250 and of change-over switches 262, 270, 286 and 294 also are in the positions shown in full lines in FIG. 5, i.e. the on-off switches are open and the common terminals 268, 276, 284 and 292 of the change-over switches are respectively connected to their non common terminals 266, 272, 288 and 296.

Suppose now that a subscriber is to be called up on line A.

First, handset 8 is lifted. This causes main on-off switch 222 to close without affecting the state of the other two on-off switches nor the position of the eight change-over switches.

From then on, first speech circuit 236 is connected to terminals 162 and 164, i.e. to line A, by a first internal line which includes, firstly, a portion of conductor 234, conductor 300, the mobile contact of change-over switch 286, conductor 278, the mobile contact of change-over switch 262, conductor 240, a portion of conductor 226, the mobile contact of on-off switch 222, conductor 218, the mobile contact of change-over switch 188 and conductor 166, and, secondly, a portion of conductor 252, conductor 306, the mobile contact of change-over switch 294, conductor 280, the mobile contact of change-over switch 270, conductor 256, a portion of conductor 246, the mobile contact of change-over switch 196 and conductor 168.

Further, since selector circuit 282 is connected across conductors 278 and 280 which form part of this internal line, it is also connected to line A.

Thus, to call a particular subscriber, it suffices to dial his number on hearing the dial tone. If the subscriber answers, the caller may then speak to him and when, at the end of the conversation, handset 8 is put down, on-off switch 222 opens again and breaks the internal line.

If, while the caller is in line with the above subscriber, someone else wishes to call another subscriber, he first picks up base 2 and since auxiliary control button 60 is then released, on-off switches 230 and 238 close and the mobile contacts of change-over switches 262, 270, 286 and 294 all move to the positions indicated in broken lines in FIG. 5. This means that the first speech circuit to be used is connected to terminals 162 and 164 by a second internal line that is more direct than the first since this second line includes, firstly, conductor 234, the mobile contact of on-off switch 230, conductor 226, the mobile contact of on-off switch 222, conductor 218, the mobile contact of change-over switch 188 and conductor 166, and, secondly, conductor 252, the mobile contact of on-off switch 250, conductor 246, the mobile contact of change-over switch 196 and conductor 168.

As for the second speech circuit 304, it is connected to terminals 174 and 176, and hence to line B, by a third internal line which includes, firstly, conductor 302, the mobile contact of change-over switch 286, conductor 278, the mobile contact of change-over switch 262, a portion of conductor 238, conductor 242, the mobile contact of change-over switch 204 and conductor 178, and, secondly, conductor 308, the mobile contact of change-over switch 294, conductor 280, the mobile contact of change-over switch 270, a portion of conductor 254, conductor 258, the mobile contact of change-over switch 212 and conductor 180.

As a result and since conductors 278 and 280 form part of the third internal line, dial circuit 282 is also connected to line B and the second caller may dial the number of the subscriber he wishes to speak to and to have a conversation with him.

If the first caller finishes while the second is still talking, he may then press main control button 56 and put down handset 8. The connection between first speech circuit 236 and line A is therefore briefly interrupted by on-off switch 222, then to be restored, so that this line remains engaged until the other caller has finished talking and put handset 8 down again.

If it is possible, handset 8 may also be put back on base 2 and the other caller may carry on talking with the entire telephone in his hands. In that case, line A becomes free again.

Suppose now, while someone is talking to some subscriber on line A, the ringing means of line B starts sounding and that diode 152 lights up. It suffices then to pick up base 2 and to reply or let someone else do so. From a circuitry point of view, the situation is exactly the same as when a second person rings another subscriber while the first person is still talking. The only difference is that no number need be dialled.

Let us now return to the starting point and suppose there is an incoming call on line B. In this event, it suffices to press button 148 and to pick up handset 8, or to proceed the other way round, to answer the call.

The positional change of this button brings about a positional change of change-over switches 188, 196, 204 and 212 and the connecting up of first speech circuit 236 to terminals 174 and 176 by a fourth internal line that is made up, firstly, by a portion of conductor 234, conductor 300, the mobile contact of change-over switch 286, conductor 278, the mobile contact of change-over switch 262, conductor 240, a portion of conductor 226, the mobile contact of main on-off switch 222, a portion of conductor 218, conductor 244, the mobile contact of change-over switch 204 and conductor 178, and, secondly, by a portion of conductor 252, conductor 306, the mobile contact of change-over switch 294, conductor 280, the mobile contact of change-over switch 270, conductor 256, a portion of conductor 246, conductor 260, the mobile contact of change-over switch 212 and conductor 180.

Of course, some other situations may occur but with the foregoing examples it should be easy to determine what will then happen. It is therefore not necessary to envisage them here too.

Further, it is clear that the invention is not limited to the arrangements hereinbefore described or suggested.

For instance, auxiliary control button 60 could be replaced by another that needs pressing for base 2 to be used as a second handset.

Selector keyboard 48 may possibly be replaced by a rotary dialling disc.

In the case of a two-line telephone, arrangements may be made to enable two people also to talk with one person at the other end of one line.

A construction of interest could also be imagined in which handset 8 is connected to the speech circuit or to one of the speech circuits not by a cord as before but by radio. In that case, the telephone should additionally comprise, firstly, a first transmitter, a first receiver and a battery housed in casing 12, a first antenna connected to the first receiver that could either also be included in casing 12 or be an external, e.g. telescopic, antenna, secondly, a second receiver, a second transmitter connected to the speech circuit and a second antenna that are associated with base 2, and, thirdly, a supply system including an AC/DC converter to enable the handset battery to be recharged when the telephone is not in use.

Should the base be too small to contain the second transmitter and the second receiver they could be combined, along with the AC/DC converter, in an auxiliary casing from which would issue the second antenna, a two-wire lead fitted with a plug for connecting the converter to the mains and another, three or four wire, cord for feeding current from the converter to the base and for connecting the second transmitter to the speech circuit.

Also, assuming the base and the handset are like those in FIG. 1, a pair of terminals could then be provided at the bottom of recess 52 to which would be connected the two supply wires from the converter and a corresponding pair of contact areas could be provided on surface 22 of handset 8, that are connected to the battery, to enable the latter to be recharged.

Moreover, handset 8 and particularly base 2 may have other, more or less aesthetic, configurations and base 2 may carry handset 8 otherwise than in the illustrated embodiments given by way of example.

We claim:

1. A telephone for connection to one end of a telephone line, which comprises a handset having a casing housing a first receiver and a first microphone, and a base, able to support the handset, having a casing, ringing means, selector means for dialling telephone numbers, a speech circuit connected to the first receiver and to the first microphone to transmit conversation signals arriving on the line to the first receiver and those produced by the first microphone to the line, first control means actuatable by the handset and switching means that can be acted upon by the control means to connect the selector means and the speech circuit to the line when the handset is taken off, said base further having a second receiver, a second microphone and second control means also able to act on the switching means to enable the second receiver and the second microphone to be connected to the line when the handset is taken off, the base casing having a shape and the second receiver and the second microphone having an arrangement within the base casing, such that the base may be used as a second handset.

2. A telephone according to claim 1, wherein the second control means include a push-button placed underneath the base and which enables the second receiver and the second microphone to be automatically disconnected from the line when the base is put on a support and which enables them to be connected when the base is lifted.

3. A telephone according to claim 1 or 2, wherein the second receiver and the second microphone are connected to the line via the speech circuit.

4. A telephone according to claim 3, wherein the second receiver and the second microphone are connected in series with the first receiver and the first microphone, and wherein the switching means include a pair of switches arranged to be simultaneously actuated by the second control means and which disconnect the second receiver and the second microphone from the line by short-circuiting them.

5. A telephone for connection to one end of a pair of telephone lines, which comprises a handset having a casing housing a first receiver and a first microphone, and a base, able to support the handset, having a casing, ringing means, selector means for dialling telephone numbers, a first speech circuit connected to the first receiver and to the first microphone to transmit conversation signals arriving on one line to the first receiver and those produced by the first microphone to said one line, first control means actuatable by the handset, second control means actuatable manually to select one or other of the lines and switching means that can be acted upon by the first and second control means to connect the selector means and the first speech circuit to the selected line when the handset is taken off, said base further having a second receiver, a second microphone, a second speech circuit connected to the second receiver and to the second microphone, and third control means also able, upon being actuated, to act on the switching means to enable the second speech circuit to be connected to the unselected line, the base casing having a shape and the second receiver and the second microphone having an arrangement within the base casing, such that the base may be used as a second handset.

6. A telephone according to claim 5, wherein the switching means are arranged to connect the selector means at the same time as the second speech circuit to the unselected line and to leave the first speech circuit connected to the selected line if it already was connected before actuation of the third control means.

7. A telephone according to claim 5 or 6, wherein the third control means include a push-button placed underneath the base and which enables automatically to disconnect the second receiver and the second microphone from the unselected line when it is placed on a support and to connect them to this line when the base is lifted.

8. A telephone according to claim 5, wherein the second control means include a pair of push-buttons placed on the base and each associated with one of the lines.

9. A telephone according to claim 8, wherein the base further has a pair of light emitting diodes associated with the push-buttons to signal on which line an incoming call is being made.

10. A telephone according to claim 5, wherein the ringing means include a pair of ringing devices each associated with one line.

* * * * *